Aug. 13, 1957  J. S. DA COSTA  2,802,427
LEVEL AND INCLINED CONVEYOR
Filed Sept. 24, 1953  7 Sheets-Sheet 1

Inventor
James Starr Da Costa
by Parker & Carter
Attorneys

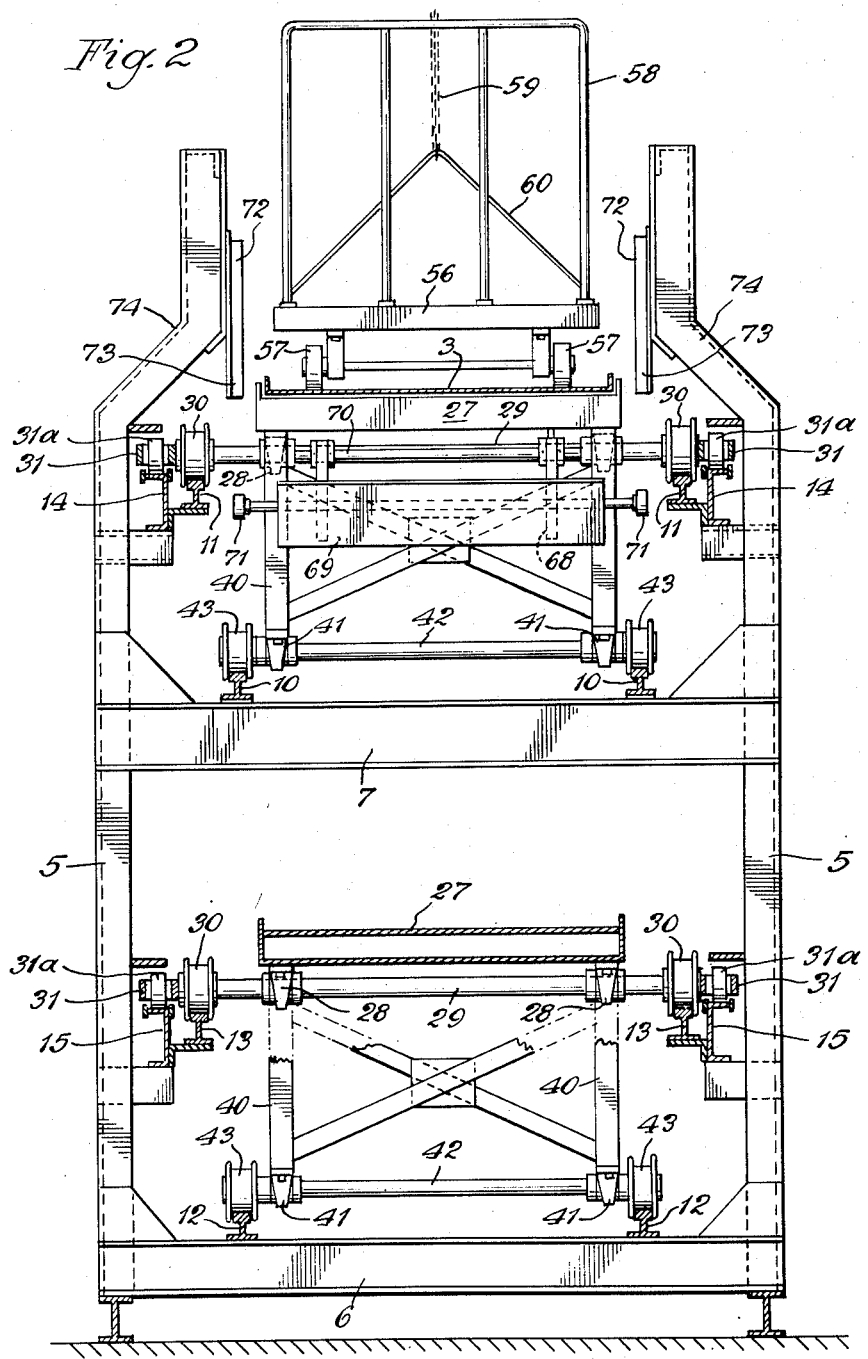

Aug. 13, 1957   J. S. DA COSTA   2,802,427
LEVEL AND INCLINED CONVEYOR
Filed Sept. 24, 1953   7 Sheets-Sheet 3

Inventor
James Starr Da Costa
by Parker & Carter
Attorneys

Aug. 13, 1957  J. S. DA COSTA  2,802,427
LEVEL AND INCLINED CONVEYOR
Filed Sept. 24, 1953  7 Sheets-Sheet 4

Inventor
James Starr Da Costa
by Parker & Carter
Attorneys

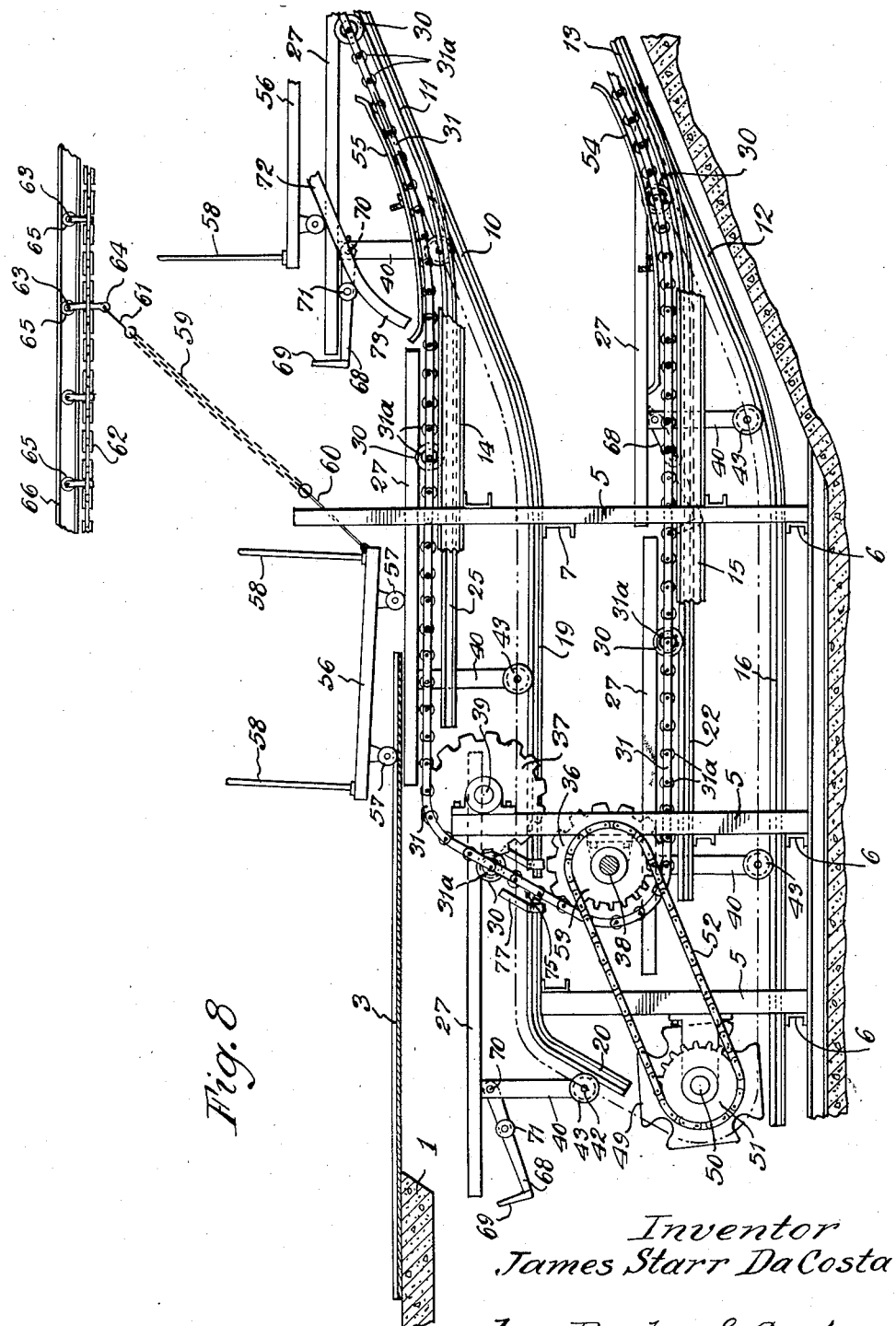

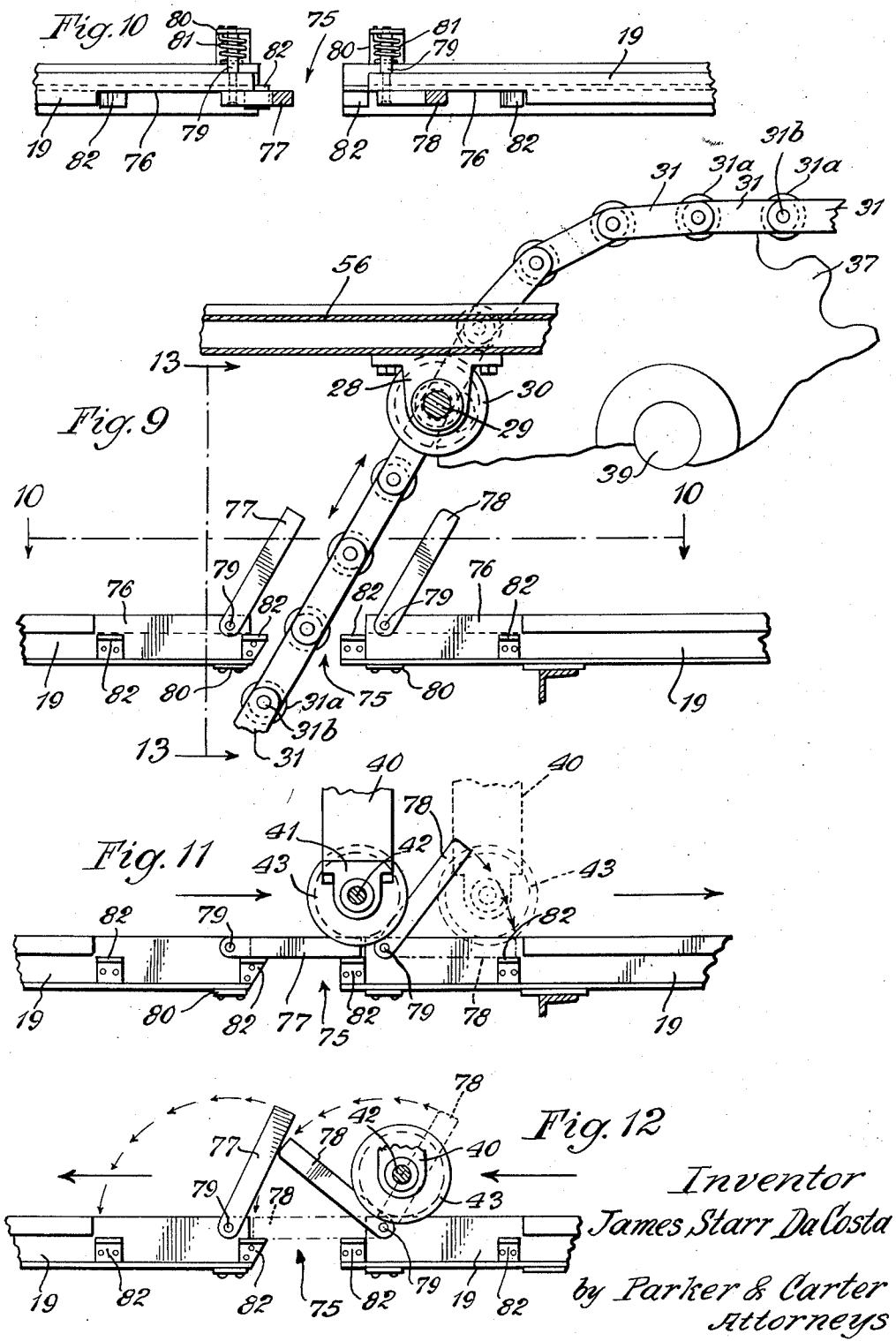

Aug. 13, 1957  J. S. DA COSTA  2,802,427
LEVEL AND INCLINED CONVEYOR
Filed Sept. 24, 1953  7 Sheets-Sheet 7
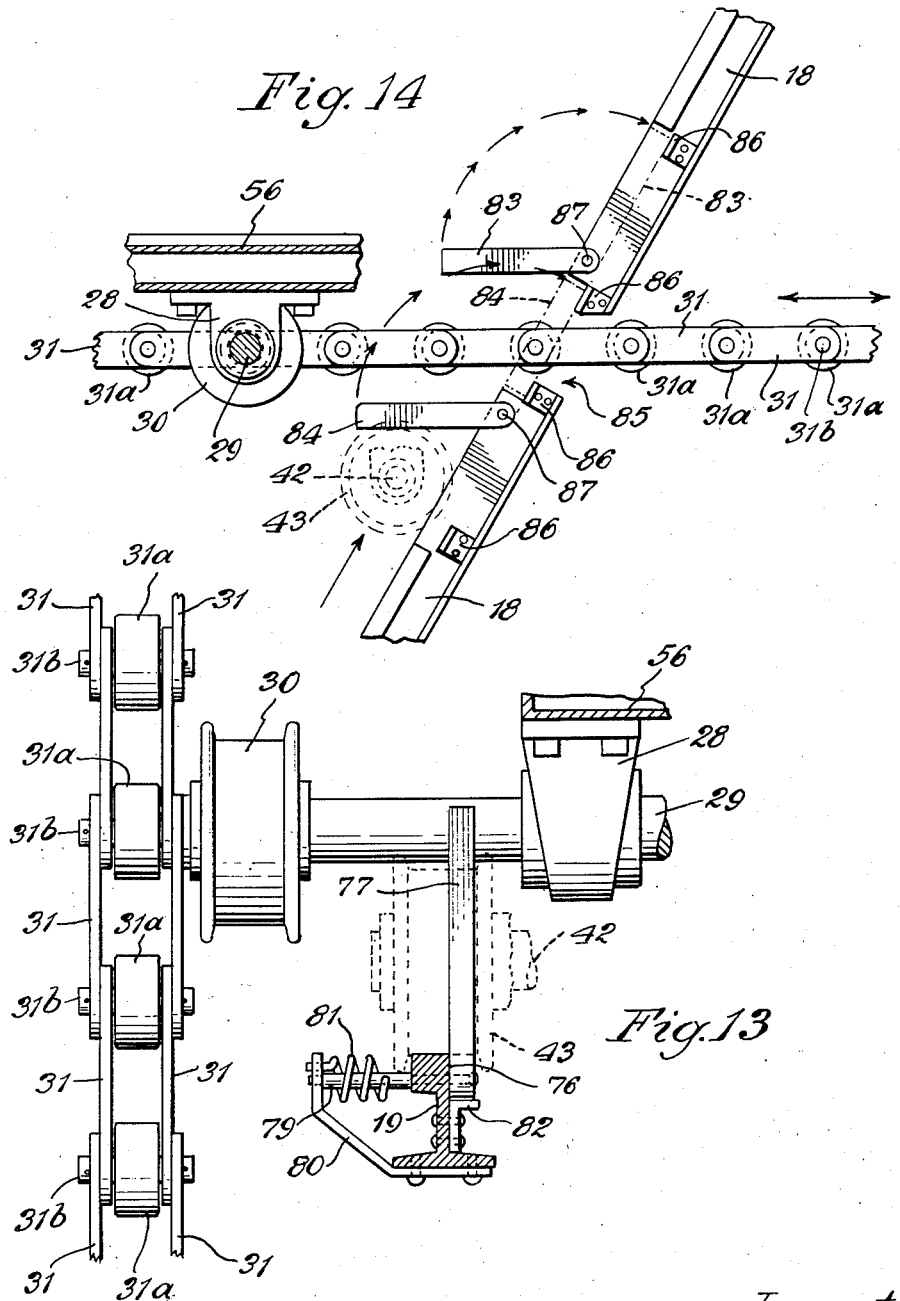
Inventor
James Starr Da Costa
by Parker & Carter
Attorneys United States Patent Office 2,802,427
Patented Aug. 13, 1957

2,802,427
LEVEL AND INCLINED CONVEYOR

James Starr Da Costa, Merchantville, N. J., assignor to Samuel Olson Mfg. Company, Inc., Chicago, Ill., a corporation of Illinois Application September 24, 1953, Serial No. 382,100

6 Claims. (Cl. 104—18)

This invention relates to a conveyor, and particularly to a conveyer of the escalator type, combined with a drag chain.

It has for one object to combine a main or escalator conveyer with a drag chain conveyer of the overhead type.

Another object is thus to combine two conveyers, one of the type primarily useful in raising articles from one level to another, and the other conveyer effective to convey articles along a level and to combine the two so that they operate in unison during the moving of articles from one level to another.

Another object is to synchronize and combine conveyers of two types, one a level conveyer and one a conveyor for raising or lowering articles from one level to another, the conveyers of these two types being combined to operate along a single path or to operate independently along two paths of different lengths and to operate in combination for a portion at least of the total path of movement of articles being conveyed by the conveyers.

Another object is to combine with a so-called main conveyer, which will retain articles upon it in a horizontal position while they are raised or lowered between levels, an additional conveyer which, while primarily concerned with moving the articles along a path disposed in a generally level arrangement, will also assist in conveying the articles between levels while they are carried by the main conveyer.

Other objects will appear from time to time throughout the specification and claims.

The invention is illustrated more or less diagrammatically in the accompanying drawings, wherein:

Figure 1 is a diagrammatic side elevation of one form of the device;

Figure 2 is a transverse vertical section taken on an enlarged scale at line 2—2 of Figure 1;

Figure 4 is a sectional detail with parts in elevation illustrating on an enlarged scale the roller and chain arrangement of the platform supporting means for the main conveyer;

Figure 8 is a side elevation with parts in section and parts broken away showing the bottom of the assembly.

Figure 9 is a side elevation with parts in section showing the lower end of the track section 19 on an enlarged scale, looking from a point between the rails 19;

Figure 10 is a section taken at line 10—10 of Figure 9;

Figure 11 is a side elevation with parts in section showing the track arrangement of Figure 9 in modified position;

Figure 12 is a view similar to Figure 11 showing a further modified position of the track parts;

Figure 13 is a section taken at line 13—13 of Figure 9 on a still further enlarged scale showing the chain, the track arrangement and portions of the car; and Figure 14 is an elevation with parts in section showing the upper portion of the track section 18.

Like parts are indicated by like characters in the specification and drawings.

In general, the invention comprises a conveyer, including chains and a plurality of platforms driven by the chains. Rollers are provided for the platforms, and inclined tracks are arranged leading from one level to another. The rollers move along the track. The platforms, which are carried by the rollers, are maintained in a horizontal position. There is associated with this platform conveyer a second drag conveyer which includes, generally, a chain or its equivalent and means for supporting and guiding the chain, such as a trolley mounting. The chain is provided with suitable means for driving it. The arrangement of the trolley or other chain guiding means for the drag conveyer is established to define the path of movement of the drag conveyer, and this conveyer, by itself, is sufficient to move the articles about the predetermined path on a level. The drag conveyer moves the articles, which as shown may be trucks, on one level to the platform or main conveyer, and it follows the incline of the main conveyer and so retains the trucks or other articles in proper position upon the platforms. When the platform conveyer has moved the trucks to the new level the drag conveyer continues along the new level and carries the truck off of the platform and then moves the truck through the predetermined path on the new level. Two conveyers thus cooperate in moving and controlling the movement of the trucks or other articles when they are moved from one level to another, but the drag conveyer is generally sufficient to move the articles about on a given level.

Figure 5:
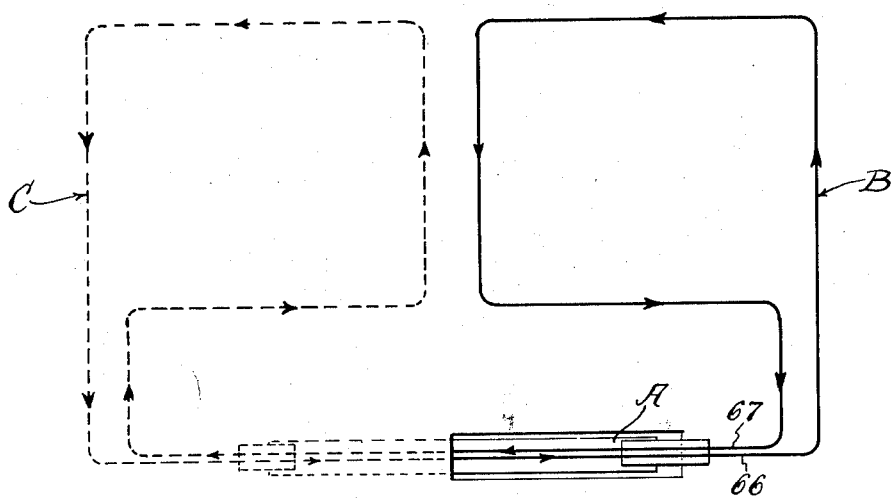
Figure 5 is a diagrammatical plan view of one adaptation of the invention.

The schematic diagram of Figure 5 shows the arrangement of the two conveyors suitable for use in raising or lowering material from one level to another. In the arrangement of this figure, movement is either up or down, but can be carried out in only one direction at a time. Only a single main or escalator conveyor is used. It is indicated generally in Figure 5 by the letter A. The path along which the drag conveyor is arranged on one level as indicated diagrammatically as B, and the path of the drag conveyor on another level is indicated at C. The arrows on the two paths indicate the direction of movement of the drag conveyor. The level on which the path B is arranged may be considered the second floor of a building, and the level on which the path C is arranged may be considered the first floor of a building. The conveyer indicated generally at A is preferably reversible.

Figure 6:
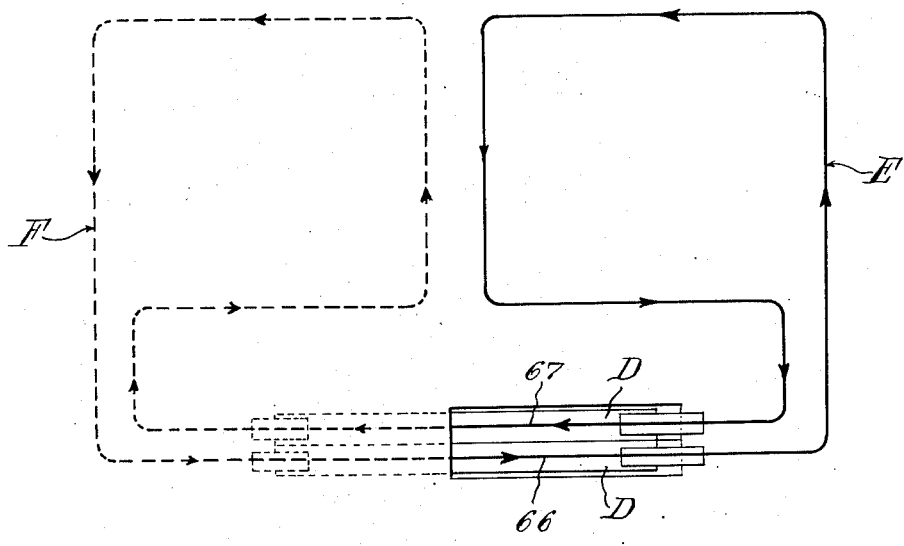
Figure 6 is a diagrammatical plan view of another adaptation of the conveyer.

In the form illustrated diagrammatically in Figure 6 there are two raising or lowering conveyers, generally of the so-called escalator type, and these are indicted as at D, D. The path of the drag conveyer on one level is indicated at E, and this level may be considered a second floor; and the path of the drag conveyer on another level is indicated at F, and this may be considered a lower floor. The direction of movement of the drag conveyer is indicated by the arrows. Thus, if there are two raising or lowering conveyers there may be continuous service in both directions at the same time.

Figure 3:
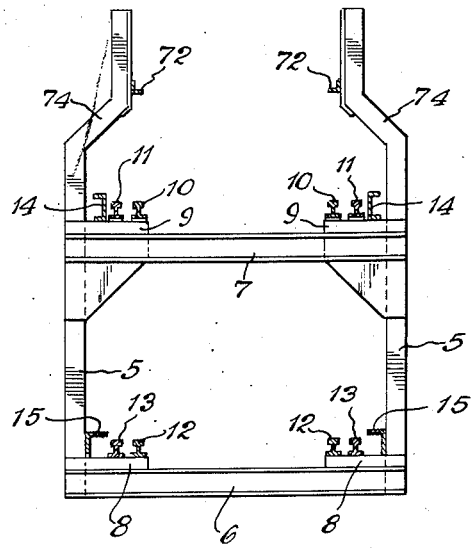
Figure 3 is a transverse generally vertical section taken at line 3—3 of Figure 1.

As shown generally in Figure 1, one suitable embodiment of the invention is illustrated and this illustration shows only a single raising and lowering or escalator type conveyer, and it shows that conveyer combined with the drag conveyer. In Figure 1 the two-floor levels appear, a lower floor 1 and an upper floor 2 are shown. At the lower floor 1 a transfer plate 3 is provided, and at the upper floor 2 a transfer plate 4 is provided. The trucks or other articles move onto the lower transfer plate 3 as they move to the conveyer for upward movement, and they move from the conveyer onto the transfer plate 4 on the completion of upward movement. These steps would be reversed if the conveyer were moving in the direction for lowering. A plurality of tracks is provided to guide the platforms which are moved, preferably by chains, to accomplish raising and lowering. The tracks may be supported in any manner. It is convenient to support them on framework which may include the generally vertical members 5, 5, which are shown particularly in Figures 2 and 3. These vertical members may be joined by transverse members 6 and 7 which carry track supports. Thus, as shown in detail in Figures 2 and 3, the members 6 carry track supports 8, 8, and the members 7 carry track supports 9, 9. The tracks are arranged in sets of pairs; one set defining a path for the platforms as they move in one direction or one "run," and another set defining a path for the platforms as they move in the opposite direction or "run." In the particular form here shown, the upper path is defined by inner tracks 10 and outer tracks 11, and the lower path is defined by inner tracks 12 and outer tracks 13. The tracks 10 and 12 are preferably positioned one above the other, and the tracks 11 and 13 are similarly positioned one above the other. Adjacent to the tracks 11, on the outside of each, is a chain guide rail or track 14, and a corresponding chain guide rail or track 15 is positioned adjacent to and alongside of the tracks 13.

All of the tracks mentioned thus far are, as shown in Figure 1, inclined upwardly and each carries at its upper and lower ends a generally level or horizontal section. Thus the tracks 12 are provided adjacent their lower ends with horizontal portions 16, and each is provided adjacent its upper end with horizontal sections 17, which terminate in sharply upwardly inclined portions 18.

The inside upper tracks 10 are provided adjacent their lower ends with horizontal sections 19, which terminate in sharply downwardly inclined portions 20. The tracks 10 are also provided adjacent their upper ends with generally horizontal sections 21.

The tracks 13 are provided with generally level or horizontal sections or portions similar to those described in connection with the tracks 10 and 12. Thus the tracks 13 are provided adjacent their lower ends with generally level or horizontal sections 22 and they are provided adjacent their upper ends with generally horizontal sections 23, which terminate in upwardly inclined sections 24.

The tracks 11 are provided adjacent their lower ends with generally horizontal sections 25 and adjacent their upper ends with generally horizontal sections 26.

Steps or platform members are arranged to move along the tracks above described and they are driven preferably by chains, and means are provided including the tracks and including sprockets, which will be described below, for moving and controlling the platforms so that they are always retained in generally level or horizontal position. The platform or step members in the particular form here shown comprise load-carrying surface members 27, which may be of almost any desired construction so long as they provide sufficient area and strength to support the load which is to be put upon them. Each is provided with bearings 28, 28 in which are supported shafts 29. At each end of each shaft 29 there is provided a flanged roller 30, and the rollers 30 engage the tracks 11 and 13 and the generally horizontal portions of those tracks. At their outer ends the shafts 29 engage chains 31 which are provided with rollers 31a. The rollers 31a are supported upon and guided by the members 14 and 15.

The chains 31, at their upper ends, are engaged by and pass about driving sprockets 32 which are positioned upon driving shafts 33. Idler sprockets 34 positioned upon shafts 35 serve to guide the chains 31, as shown in Figure 1. The shafts 33 and 35 are stub shafts and do not extend across between the sprockets. Additional idler sprockets 36 and 37 carried respectively by stub shafts 38 and 39 are positioned adjacent the lower end of the chains 31.

Each step or platform member 27 is provided with a shaft-supporting structure 40 which carries bearings 41 within which shafts 42 are supported for rotation. The shafts 42 carry, at their iuter ends, flanged rollers or wheels 43 which engage the tracks 10 and 12. Adjacent the upper end of the conveying assembly there is positioned a pair of notched guiding sprockets 44 carried upon stub shafts 45. There is associated with each of the guide sprockets 44 a sprocket 46 about which is positioned a chain 47. Each chain 47 engages a sprocket 48 positioned on one of the shafts 33. Thus the guiding sprockets 44 are connected to the driving sprockets 32 which drive the chains 31. Positioned adjacent the lower end of the assembly is a second pair of notched guiding sprockets 49. Each of these guiding sprockets 49 is carried on a stub shaft 50 with which is associated a sprocket 51. Each sprocket 51 is engaged with a chain 52, which, in turn, is engaged with a sprocket 53 on one of the shafts 38.

The chains 31 follow generally the path defined by the tracks 11 and 13 and by the generally horizontal portions of these tracks. Guiding means are provided to guide the chains in their movement as they move from the inclined to the generally level or horizontal portions of their path. Such guiding means are shown in Figure 1, adjacent the lower end of the assembly and include guide members 54 and 55. Obviously, any suitable sort of guide members may be used to cause the chains 31 to follow any desired path.

While many different types of load-carrying means may be used, trucks or dollies are illustrated. As shown, these include a load-carrying part or platform 56 supported by rollers 57. If desired, the platforms may include end members 58. The invention is not limited to any particular load-carrying member. A towline or tow chain 59 is secured by a yoke 60 to the truck. At its upper end the tow chain or towline is provided with a hook 61 to engage a chain 62. This chain is preferably provided with trolley members 63, one or more of which is provided with a downward extension 64 suitable for engagement with the hook 61.

Figure 7:
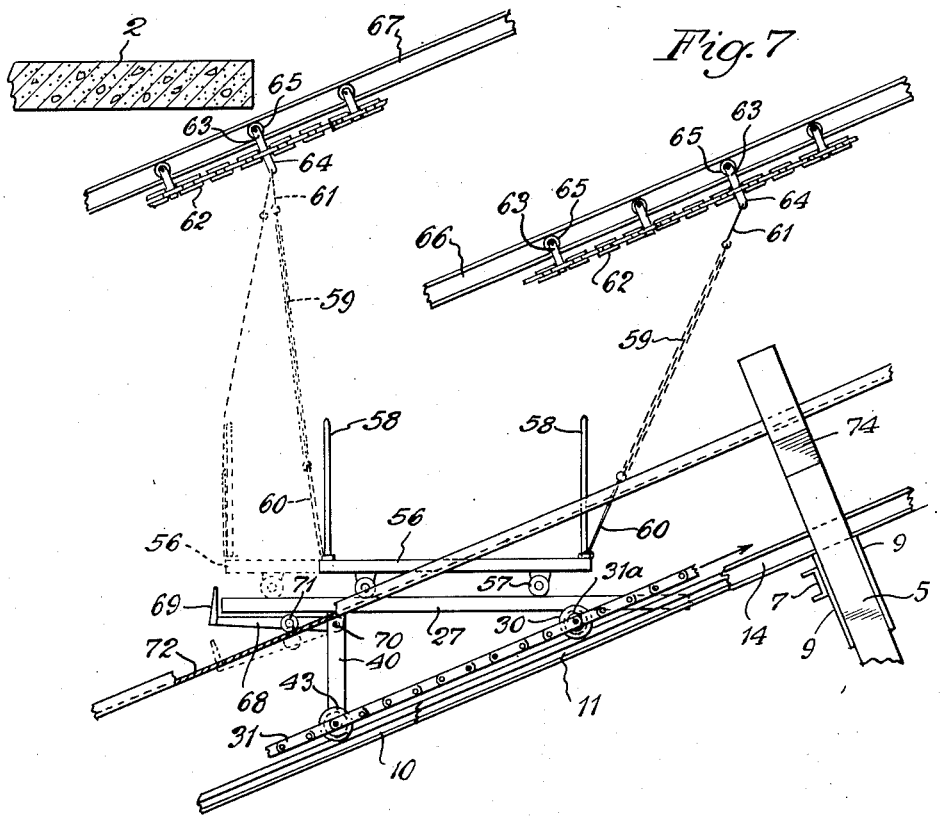
Figure 7 is a fragmentary side elevation of a portion of Figure 1 on an enlarged scale showing the parts generally.

The trolleys carry rollers 65 which are supported and guided in a track 66, as shown in Figures 1 and 7.

The track 66, as shown in Figure 1, is merely one part of a track system which includes and defines the total path of the drag conveyor. This path and the tracks which define it may be of almost any desired plan. The drag chain track and the raising or lowering conveyor move together and preferably along generally parallel paths, at least during the portion of the total run of the drag conveyor, during which the drag conveyor is moving from one level to another. This portion of its total run or path is shown in Figure 1. Where two main or escalator type conveyors are used, as shown in Figure 6, the drag chain and its guiding tracks are positioned as shown in Figure 1. There are thus two separate tracks, one overlying each of the main conveyors. Where, however, only a single main conveyor is used, as shown in Figure 5, the tracks for the drag conveyor are so arranged that the "up" and the "down" sections of the track lie side by side, preferably close to each other, so that the "down" run of the chain and the "up" run of the chain, although one above the other, move in vertical planes which are close to each other. Thus, as shown in Figure 1, the "up"

run of the track is defined by the track 66, and the "down" or return run is defined by the track 67. As shown in Figure 5, the tracks 66 and 67 on the upper level are connected by a loop B, above referred to, and on the lower level they are connected by a loop C, above referred to. One chain path preferably comprises the portions 66, 67, B and C. It is driven by any suitable means, not shown, and it is driven by the same source as the chains 31 which move the platforms 27. As shown in Figure 6, the same chain appears and the "up" run or path 66 is positioned over one main conveyor D, and the "down" run or path 67 is positioned over the other main conveyor D. In this case the runs 66 and 67 are connected on the upper level by a loop E and on the lower level by a loop F, both previously referred to. The chain is driven in this arrangement by the same source which drives the chains 31.

For some purposes it is useful to provide safety means on each platform to prevent the load carrier or the load from being dislodged accidently. One such safety means comprises a safety lever, or arm, 68, having a nose 69 adapted to project above the surface of the platform 27 sufficiently to engage the truck 56, or whatever other member is upon the platform. The lever 68 is pivotally supported at 70 upon a platform 27 and is provided intermediate its end with a roller 71. The roller 71 engages a guiding track 72 which, at its lower end, is downwardly bent as at 73. If this safety means is provided the safety guide tracks 72 may be conveniently carried upon the framework members 5, which for that purpose may be inwardly bent as at 74. A truck may be provided with one or more of the safety members or safety devices.

In the drawing of Fig. 1 the chain 31 has been omitted because of the small scale of that drawing. The dash line of that figure shows the center line of the rollers 30 as they move about the system and in that sense it approximately coincides with the position occupied by the chain 31 in the assembly.

The dot and dash line sections at the upper and lower ends of the system, as shown in Fig. 1, indicate the center line of movement of the rollers 43. During the major part of the movement of the load carrying members 27, the rollers or wheels 30 and the rollers or wheels 43 follow the same path. It is only at the upper lower ends of the system that they do not. The rollers 30, at these sections, follow generally the path of the chain 31 and the rollers or wheels 43 depart from the path of the chain 31 and follow the path indicated in dot and dash lines, being guided by track sections 19, 20 and 16 at the lower end and by track sections 26, 18 and 17 at the upper end.

*Use and operation*

In general the device of this invention is arranged to convey one or more load carrying platforms from one level to another, and to move the platform or platforms about a predetermined path on one or two levels.

Figures 5 and 6 indicate paths on different levels and they indicate the movement of the system from one level to the other. Figure 5 shows a single system which operates in one direction at a time conveying articles up or down selectively.

Figure 6 shows a system which may operate in both directions at the same time, carrying articles up and down simultaneously. There are in Figure 6, in effect, two escalator sections, where in Figure 5 there is but a single escalator section.

The trucks or dollies 56 are fastened to the chain 62 and the chain moves at the same speed as the escalator. The precise details of the drive are not shown and the invention is not limited to any precise drive. The sprockets shown generally in Figure 1 at the upper or right hand, drive the chain 31 of the escalator. The chain 62 is driven at the same speed and is driven from the same source as chain 31. With the system in operation, the chain 62 moves in the same direction as the escalator with which it is associated.

Trucks or dollies 56 fastened to the chain 62 are carried by that chain toward the escalator and are drawn by it upon the escalator. A truck is shown in Figure 8 in particular as being moved upon a platform 27 of the escalator. As the truck is moved upon the escalator, it is held in position thereon by the chain 59 secured to the conveying chain 62, and is carried upwardly by the escalator. When the escalator reaches the upper floor or the upper level, the chain 62 carries the truck along on that level and moves it from the escalator platform upon which it was carried.

After leaving the escalator, the truck is carried along by the chain 62 and follows the course defined by the positioning of the track along which the chain 62 runs.

If desired, a safety member may be provided on each truck and as shown, the member 68, 69 is mounted on the truck, the arm 68 carrying the roller 70. When this roller is out of engagement with the track 72, the weight and balance of the member 68 are such that it swings downwardly, bringing the upper end or point of the member 69 below the surface of the platform 27 and out of the path of the dolly or truck 56. The device is shown in this position at the lower left end of Figure 8.

As the truck is moved upwardly with the escalator, the roller 71 of the safety device contacts the curved end of the track or rail 73, and as the upward movement of the escalator continues, the safety device is moved into the position shown generally at the upper right hand of Figure 8. It continues in this position as long as the roller 71 is raised by the track 72. In this position, the portion 69 extends sufficiently above the upper surface of the platform 27 to engage the axle or some other part of the truck 56 to prevent its falling rearwardly off of the member 27.

Such safety devices may or may not be present. If present, they will generally be applied to each member 27. In the case of the system shown in Figure 6 where there are two escalator sections operating simultaneously, one serves as the upward or raising section and the other serves as the lower or descending section. Where there is but a single escalator section, as in Figure 5, the system will convey up or down, one direction at a time, and must be reversed, the escalator and the chain 62 being caused to move in one direction for "up service" and in the opposite direction for "down service."

The chain 59, as shown in Figure 7, is in the direction and arrangement which it occupies during up service. The same chain is shown in Figure 7 in dotted lines in the direction and position is occupies for down service.

The track arrangement of Figure 1 is that which is used where there is but a single escalator section and the track section 66 acts to guide and support the chain 62 in its upward run and the track section 67 acts to guide and support the chain 62 in its downward run. Where there are two escalator sections, as in Figure 6, only a single track section is needed over each escalator section.

When the load carrying platforms 56 move upwardly or downwardly about the lower left hand end of the assembly as shown in Figure 1 and Figure 8, the shaft 29, since it is of greater length than the width between the rail portions 19, must pass through them. The arrangement which makes this possible is shown in Figures 9 to 13 inclusive.

Each of the rails 19 is broken or cut away to provide a gap 75. Each of the rails 19 is cut away as at 76 to receive a gate portion 77 or 78. To each of these gate portions is fixed a shaft 79 which is supported in part within the rail 19 and in part in a stirrup 80.

A torsion spring 81 is positioned about each of the shafts 79 and at one end is fixed to the stirrup and at the other end to the shaft 79. The torsion springs are biased to hold the gates 77 and 78 in the position of Figure 9. Stops 82 may conveniently be positioned on the track sections 19 to limit the downward movement of the gate portion 77 and 78.

In moving about the sprocket 37, the chain 31 carries the load supporting platforms 56 either up or down depending upon the direction in which the system may be operating. The rollers 43 running on the track section 12, 16, 17 follow the direction and contour of that track, and the shaft 42 which carries the rollers 43, is engaged in the notches in the sprocket member 49.

During the same portion of the cycle, the shaft 29 which carries the rollers 30 must pass through the plane of the horizontal section 19 of the track 10. The gate construction shown in Figures 9 to 13 and described above permits that.

As shown in Figures 9 and 10, the gates 77 and 78 will, when free to do so, occupy the position shown in those figures, in which neither of them extends across the gap 75 between the ends of the track sections 19 and the shaft 29 is thus always free to pass through this gap. However, the gap must be closed to accommodate the rollers 43 whether the device is running clockwise or counterclockwise. These conditions are shown in Figures 11 and 12.

In Figure 11 the direction of movement of the rollers 43 along the track section 19 is to the right as shown by the arrows. The rollers 43 will first contact the gates 77 and move them downwardly to form a continuation of the track portions 19 and to bridge the gap 75. As it continues further it will depress the gate 78, merely moving it downwardly toward and finally to the dot-and-dash position of Figure 11. In that position the rollers 43 run over the gates 78 and move onto the right hand portion of the track sections 19.

When the movement of the assembly is in the opposite direction as shown by the arrows in Figure 12, the rollers 43 will first contact the gates 78 and will move them downwardly to the dot-and-dash position of Figure 12 in which they form a continuation of the rail sections 19 and bridge the gap 75. As the rollers continue to move, the gates 77 will be carried in the direction of the arrows until they contact the stops 82 and are out of the way to permit the rollers to continue movement in the same direction.

The construction thus described provides a gap between adjacent ends of the track sections 19 which is normally open to permit passage of the shaft 29 in either direction. When the rollers 43 must move across the gap, the gate members are arranged to be moved as the rollers approach the gap so that the gate sections span the gap and permit the rollers to cross.

At the upper right hand end of the track system as shown in Figure 1, the section 18 must be broken in a manner similar to which the section 19 is broken at the lower left hand end.

This construction is illustrated in Figure 14 and for this purpose a pair of gates 83 and 84 is arranged to bridge the gap 85 between the track sections 18. The track sections 18 are cut away to provide room for the gates 83 and 84 and stops 86 are provided to limit the movement of the gates in one direction. The gates are made in the same manner as the gates 77 and 78 and need not be shown again. Each is carried on a shaft 87 provided with a torsion spring, not shown, and the springs are biased to hold the gates normally in the position of Figure 14. In this position, the gap 85 is always open between the adjacent ends of the track sections 18 so that the shaft 29 may pass through. When the rollers 43 move along the track section 18 in either direction they will encounter first one gate and then the other. If the rollers are moving upwardly the gate 84 is encountered first and is moved in the direction of the curved arrow until it finally occupies the dot-and-dash position of Figure 14 in which it forms a bridge for the gap 85 across which the rollers 43 may move.

The movement of the rollers in the upward direction, as it continues, will move the gate 83 in the direction of the curved arrow and will finally move it until it lies as a continuation of the upper section 18 and the roller may pass over it.

When the rollers 43 are moving in the downward direction of the track sections 18, the gate 83 is encountered first and is moved downwardly to bridge the gap between the track sections 18, and then the gate 84 is moved downwardly out of the way until it lies flush with the upper surface of the lower track section 18.

The arrangement of Figure 14 thus provides means for permitting the shaft 29 to pass through the track section 18 and provides means for bridging the gap through which it passes to accommodate the rollers 43 when they must move across the gap.

In the several forms of the device, the chain 31 is shown as the means which moves the members 56 about the track system. This chain in the particular form shown is illustrated in some detail in Figures 4, 9 and 13. It includes link portions 31, rollers 31a and pintle pins 31b. The invention is not limited to the use of this particular chain, but it is convenient and for some purposes preferable. The rollers 31a contact the guiding members 54 and 55 during the movement past these members. The scale of Figure 1 in which all of these parts appear is such as to make impossible a detailed showing of the features just described.

I claim:

1. Means for moving a plurality of vehicles about and between two separated levels and for maintaining said vehicles gravitationally on an even keel at all times, comprising parts defining said levels and parts defining an incline associated with and extending between said levels, and a plurality of conveying means, means for supporting and guiding one conveying means about said levels and between them and means for driving said conveying means, a plurality of vehicles secured continuously thereto, another of said conveying means extending between said levels and adapted to convey said vehicles between said levels, said conveying means being in proximate relation to each other throughout the path of movement of said first conveyor between said levels.

2. Means for moving a plurality of vehicles about and between two separated levels and for maintaining said vehicles gravitationally on an even keel at all times, comprising parts defining said levels and parts defining an incline associated with and extending between said levels, and a plurality of conveying means, one comprising a drag conveyor, means for supporting and guiding one conveying means about said levels and between them and means for driving said conveying means, a plurality of vehicles secured continuously thereto, another of said conveying means comprising an escalator extending between said levels and adapted to convey said vehicles between said levels, said escalator and said drag conveyor being in proximate relation to each other throughout the path of movement of said first conveyor between said levels.

3. In combination a supporting structure, defining a pair of levels, a drag conveyor including a drag member, means for supporting the drag member for movement about a pattern on the said levels and means for supporting the drag member at an incline between the two levels, means for driving said drag member, a plurality of vehicles continuously secured thereto, said vehicles being gravitationally supported on an even keel at all times by said supporting structure and along said incline, and an additional conveying means for transporting said vehicles from one level to another, said drag conveyor generally overlying said transporting means throughout substantially the full length of said transporting means.

4. In combination in a system effective to move a plurality of vehicles about a closed circuit pattern along a plurality of separated levels and between said levels and for maintaining said vehicles on an even keel at all times, means including a supporting structure, defining said plurality of levels, a drag conveyor extending over said levels and between them, a plurality of vehicles continuously connected to said drag conveyor, means for driving said drag conveyor to move it and said vehicles about said pattern on said levels, an escalator extending between said levels and positioned beneath and in proximity to that portion of said drag conveyor which extends between said levels, and means for driving said escalator, said escalator being effective to move said vehicles from one level to another.

5. In combination a means defining a plurality of separated, generally horizontal levels, one generally above the other, means defining an incline connecting them, an escalator extending along said incline and means for driving said escalator, a drag conveyor, means for guiding said drag conveyor over a predetermined closed pattern, said pattern being partially on one level and partially on the other and overlying said incline and said escalator, and a plurality of vehicles continuously fixed to said drag conveyor, said drag conveyor being effective to move said vehicles to and from said escalator, said escalator being effective to move said vehicles along said incline from level to level.

6. In combination, for moving vehicles about a closed circuit path on a plurality of levels and from one to the other of said levels, means comprising a first drag conveyor extending over the entire path and adapted to drive the vehicles along that portion of the path which lies on said levels, and a second, escalator conveyor adapted to move said vehicles from one level to the other, the two conveyors being in proximate relationship along that portion of the path which extends from one level to the other, the vehicles being continuously connected to said first drag conveyor.

References Cited in the file of this patent

UNITED STATES PATENTS

| | | |
|---|---|---|
| 519,561 | Berg | May 8, 1894 |
| 722,502 | Edison | Mar. 10, 1903 |
| 813,416 | Ginger | Feb. 27, 1906 |
| 1,148,901 | Innes | Aug. 3, 1915 |
| 2,128,492 | Mena | Aug. 30, 1938 |
| 2,147,979 | Kearney | Feb. 21, 1939 |
| 2,163,693 | Margles | June 27, 1939 |